US007756786B2

(12) United States Patent
Trende et al.

(10) Patent No.: US 7,756,786 B2
(45) Date of Patent: Jul. 13, 2010

(54) METHOD AND SYSTEM FOR PROCESSING MESSAGES IN A BILL PAYMENT AND PRESENTMENT SYSTEM OVER A COMMUNICATIONS NETWORK

(75) Inventors: Robert G. Trende, St. Charles, MO (US); Paul J. Mila, Carle Place, NY (US); Cathleen Conforti, Ocean, NJ (US); Patrick J. Leathrum, Edwardsville, IL (US); Clifford A. Kinnunen, Jr., Granite City, IL (US); Brian D. Lock, Washington, MO (US); Matthew T. Holton, St. Louis, MO (US); Jeffrey M. Stark, Ballwin, MO (US)

(73) Assignee: MasterCard International Incorporated, Purchase, NY (US)

( * ) Notice: Subject to any disclaimer, the term of this patent is extended or adjusted under 35 U.S.C. 154(b) by 2094 days.

(21) Appl. No.: 09/821,263

(22) Filed: Mar. 29, 2001

(65) Prior Publication Data

US 2002/0049671 A1 Apr. 25, 2002

Related U.S. Application Data

(60) Provisional application No. 60/192,828, filed on Mar. 29, 2000, provisional application No. 60/211,813, filed on Jun. 14, 2000.

(51) Int. Cl.
*G06Q 40/00* (2006.01)
(52) U.S. Cl. .......................................... 705/40; 705/35
(58) Field of Classification Search .................. 705/35, 705/40, 38, 36 R, 37
See application file for complete search history.

(56) References Cited

U.S. PATENT DOCUMENTS

| 5,699,528 | A | 12/1997 | Hogan ........................ 395/240 |
|---|---|---|---|
| 5,832,460 | A | 11/1998 | Bednar et al. ................. 705/27 |
| 6,317,745 | B1 * | 11/2001 | Thomas et al. .............. 707/100 |
| 6,385,595 | B1 * | 5/2002 | Kolling et al. ................ 705/40 |
| 6,578,015 | B1 * | 6/2003 | Haseltine et al. ............. 705/34 |
| 2002/0002536 | A1 * | 1/2002 | Braco ......................... 705/40 |

OTHER PUBLICATIONS

High times for Integrion Brian O'Connell. Bank Technology News. New York: Feb. 2000. vol. 13, Iss. 2; p. 17, 2 pgs.*
PayMyBills.com to Offer Free Service to Consumers Nationwide Beginning Today; Limited-Time Offer Open to First 25,000 New Customers to Sign Up for Company's Bill Management Service Business Editors. Business Wire. New York: Jan. 18, 2000. p. 1.*

(Continued)

*Primary Examiner*—Lalita M Hamilton
(74) *Attorney, Agent, or Firm*—Baker Botts L.L.P.

(57) ABSTRACT

In a bill payment and presentation system, a method for electronically routing billing information over a communications network is provided, using an open financial exchange communication protocol. The method provides for a centrally located mainframe system and a switching system for coordinating the routing of messages between customer service providers and biller service providers. In particular, the method collects at the CSPs and at the BSPs mainframe application files comprising the messages, forwards these files in batch mode to the mainframe system and converts with a switching system these mainframe files into web-enabled addresses, allowing for the effective transmission of financial billing information in flat-file and/or Internet-based form.

4 Claims, 4 Drawing Sheets

OTHER PUBLICATIONS

MasterCard International Press Release: "MasterCard Launches Electronic Bill Presentment for Complete Online Billing Solution," Online, Mar. 28, 2000, retrieved from Internet: URL:http://www.mastercardintl.com/about/press/presreleases/cgi?id=290&rpps=1> on Jun. 19, 2002.

Avolent Press Release: "MasterCard's OFX-Based Hub to Greatly Enhance Connectivity Between Customer and Biller Service Providers," JustInTime, Online, Mar. 28, 2000, retrieved from Internet: <URL:http://www.justintime.com/news/releases/2000_03_28.html> on Jun. 19, 2002.

Online Resources Press Release: "Online Resources Links Financial Institution to MasterCard Network for Bill Presentment," Online Resources, Mar. 28, 2000, retrieved from Internet: <URL:http://www.orcc.com/admin.asp?aID=news&sID=overview&ssID=2&tID=13> on Jun. 19, 2002.

Open Financial Exchange Specification, Edition, 1.5.1., Nov. 23, 1998, (see www.ofx.net).

Open Financial Exchange Specification, Edition 1.5.1., Nov. 23, 1993, (see www.ofx.net).

\* cited by examiner

METHOD AND SYSTEM FOR PROCESSING MESSAGES IN A BILL PAYMENT AND PRESENTMENT SYSTEM OVER A COMMUNICATIONS NETWORK

PRIORITY APPLICATION

This application claims priority to United States Provisional Application No. 60/192,828 filed Mar. 29, 2000 entitled "System and Method for Providing a Switch for Routing Electronic Transactions" and to United States Provisional Application No. 60/211,813 filed on Jun. 14, 2000, and entitled "Remote Payment and Presentment Services RPPS", which are hereby incorporated by reference.

BACKGROUND OF INVENTION

This invention relates to a method and system for electronically routing billing information to customers over a communications network using an open financial exchange communication protocol and more particularly to a method for enabling, in a bill payment and presentment system, mainframe application files to be reformatted into Internet streams and transmitted over an open communications network such as the Internet.

As evident by the prior art, there are different types of bill presentment and payment systems. For instance, U.S. Pat. No. 5,832,460 to International Business Machines Corporation (the "IBM patent") discloses a system and method for electronically creating, presenting, paying and reconciling bills. More specifically, the IBM patent discloses a system involving a bill originator or service provider (such as gas, electric or telephone company), the bill payers or customers, and their respective banks, as well as an electronic bill presenter which is in electronic communication with all of these parties. The bill presenter sorts the bills from various originators and presents the bills for a selected customer to that customer who then in turn indicates to the bill presenter the bills that he or she wishes to pay and the amounts of payment. The bill presenter notifies the bill payer's bank and the bill originator of the desired payment. The bill payer's bank sends a message of payment to the bill originator's bank who informs the originator.

U.S. Pat. No. 5,699,528 to MasterCard International Incorporated (the "MasterCard patent") discloses a bill delivery and payment system over a communications network. The MasterCard patent discloses a system comprising a plurality of payee computers which feed billing information into a bill capture device and server for formatting billing data into subscriber specific bill images over the Internet. In this manner, subscribers may obtain their respective billing information by using a web browser to access the server computer to view the images and pay his or her bills.

As disclosed in the MasterCard patent, an electric bill service company oversees the service and controls the server computer (and the bill capture device) and the communications capabilities which include affording Internet access and receiving the billing information from the payee computers pursuant to an agreed-upon protocol.

As can be appreciated by those skilled in the art, because of the different bill presentment and payment systems being developed and utilized and the desire to create an open and uniform but secure exchange of messages and information over the Internet which would facilitate and expand the use of electronic bill presentment and payment, as well as other financial transactions, such as stock transactions and trading, CheckFree Corporation, Intuit Inc. and Microsoft Corp. jointly designed the Open Financial Exchange ("OFX") format which has itself evolved over time, providing an original release 1.02, and additional Releases 1.5.1, 1.6 and 2.0. The OFX is a completely open format designed for use on client/server systems utilizing the Internet. OFX is syntactically similar to HyperText Markup Language (HTML), featuring tags to identify and delimit the data, which allows it to evolve over time. Familiarity with the OFX format as disclosed in "Open Financial Exchange Specification," Edition 1.5.1, Nov. 23, 1998, is assumed.

Even with the use of the OFX format there is still inefficiency and lack of uniformity in the market. In the current electronic bill payment and presentation (EBPP) environment, there are customer service providers or CSPs (also referred to as the "originators") and biller service providers (BSPs) (also referred to as the "concentrators"). The CSP is a financial institution or a sponsor bank that initiates payment on behalf of its customers, such as financial institutions that offer telephone or bill payment services, or sponsor banks and credit counseling agencies that offer consumer debt management plans and payment services. The BSP is an institution that owns the business relationship with the billers or creditors being paid by the originator's customers. The BSP is responsible for reformatting the transaction details to meet the biller's accounts receivable requirements and to settle with the billers.

In the past, participants have connected via a point-to-point method via the Internet and since each CSP and BSP needs to connect with each other, they have set up different agreements with each partner. This, however, became extremely cumbersome for both BSPs and CSPs as new participants came into the market.

Seemingly in response to the need for a centralized switching facility, Chase Manhattan Bank, First Union National Bank and Wells Fargo Bank founded a company named Spectrum EBP, LLC, which is a bank-owned payment system utility that routes electronic bills and payments between billers and consumers. The Spectrum switch operates between biller service providers, which convert billing data into electronic form on behalf of billers, and consumer service providers, which deliver electronic bills to consumers. In the Spectrum system, the BSPs aggregate the billing files from billers and format them into industry standard OFX messages and transmit the files to Spectrum, which then validates the transactions and routes the bill to the appropriate CSP for posting on the consumers' computer screens. The consumers' electronic payment messages are transmitted from their CSPs and routed to Spectrum for clearing and settlement to the member financial institution.

Even with the Spectrum switching system, in today's OFX environment, electronic bill payment and presentation is typically conducted solely over the Internet through public communication lines using Internet security protocols. The present systems are still flawed due to their inability to utilize all information available and in particular mainframe application files in batch mode. There is therefore a need to provide for a network application which utilizes the OFX format and facilitates in an open environment the exchange or switching of electronic bill presentment summary information among CSPs and BSPs in an efficient, effective and functionally enhanced manner, but which also allows for both the utilization of mainframe application files and data, and the interexchange of such related information over both public and private lines.

SUMMARY OF THE INVENTION

According to the present invention, a method for electronically routing billing information over a communications network using an open financial exchange communication protocol is provided, which includes the following steps: enrolling billers and customers to participate in an electronic bill payment and presentment system having a centrally located mainframe system; providing customer service providers to interface with the customers; providing biller service providers to interface with, and collect billing information from, the billers; providing a centrally located switching system coupled to the bill payment and presentment system for coordinating the transfer of messages between the customer service providers and the biller service providers; generating at the customer service provider or at the biller service provider mainframe application files comprising the bill presentment related messages from the customers and billers, respectively; forwarding the mainframe application files in batch mode to the centrally located mainframe system; and converting at the switching system the mainframe application files into Internet accessible addresses for delivery of the messages over the Internet to one or more intended recipients.

Preferably, a file distribution agent is provided for appending to the mainframe application files a HTTP header; and a look-up table is used to determine the Internet accessible addresses. Functionality is further enhanced by the provision of pushing and bursting techniques which allow for the efficient transmission of message requests and responses.

In this manner a method is provided which allows participants multiple connectivity options using present open financial exchange protocols and more specifically allows participating banks with mainframe application files to nonetheless participate in a bill payment and presentment system by forwarding such applications in batch to a centralized mainframe computer which in conjunction with a file distribution agent and server configuration converts such files for Internet transmission and vice versa.

BRIEF DESCRIPTION OF THE DRAWINGS

Further objects, features and advantages of the invention will become apparent from the following detailed description taken in conjunction with the accompanying figures showing a preferred embodiment of the invention, in which.

Figure 1:
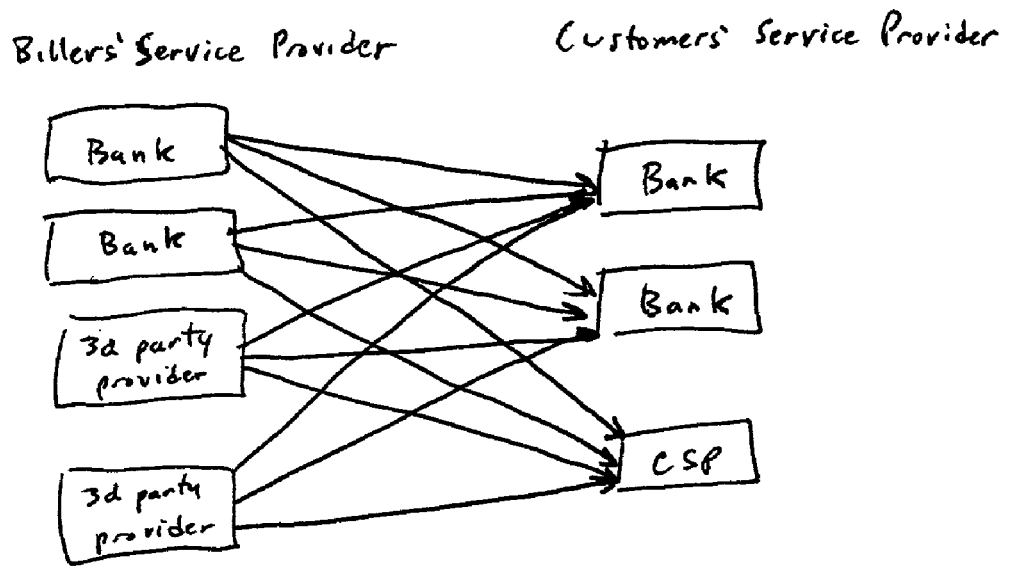
FIG. 1 is a block diagram showing the typical prior art relationship amongst biller service providers and customer service providers.

Throughout the figures, the same reference numerals and characters, unless otherwise stated, are used to denote like features, elements, components or portions of the illustrated embodiments. Moreover, while the subject invention will now be described in detail with reference to the figures, it is done so in connection with the illustrative embodiments. It is intended that changes and modifications can be made to the described embodiments without departing from the true scope and spirit of the subject invention as defined by the appended claims.

DETAILED DESCRIPTION OF THE PREFERRED EMBODIMENT

Figure 2:
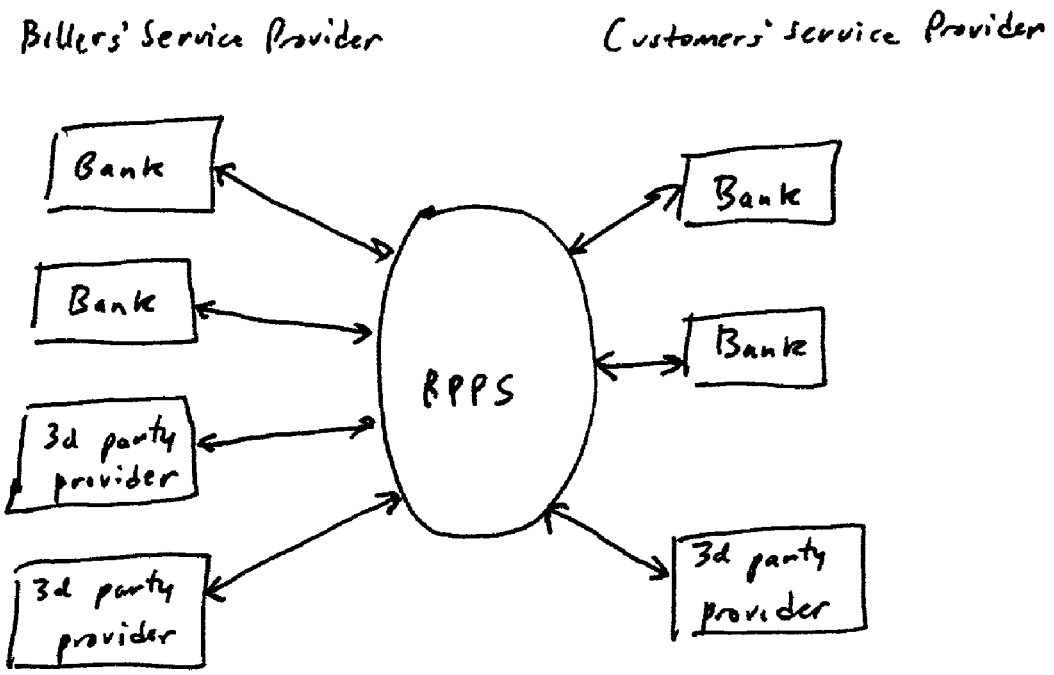
FIG. 2 is a block diagram showing the relationship amongst BSPs and CSPs with the utilization of a remote payment and presentment system ("RPPS") of the present invention.

In the current environment, depicted in FIG. 1, the need for each CSP and BSP to be connected could result in a very cumbersome and complicated system. In accordance with the preferred embodiment of the present invention, however, and as depicted in FIG. 2, a pass-through thin-consolidator remote bill payment and presentment system (RPPS) is provided with a switching system which allows members and participants to use industry-standard OFX servers and clients, as well as other connectivity methods, to communicate with other CSPs and BSPs over an existing financial company network (such as MasterCard International Corporation's network) via the Internet, a global file transfer system (GFT) and/or a virtual private network (VPN), explained in greater detail below. According to the preferred embodiment of the invention, a central financial processing mainframe (FPM) is provided which allows for the transfer into the switching system of mainframe application files coordinated preferably by the global file transfer system or GFT.

Preferably, as mentioned, the RPPS will be a pass-through thin consolidator, meaning that RPPS will not store any data for either the BSP or CSP, but rather, will offer a means of enhanced communication for both. When a message is received by RPPS, it parses the message and preferably performs standard validations, captures routing information and pertinent log data, rebundles the message, and delivers it to the intended recipient over secure lines. RPPS also preferably provides various reporting functions for participants, as well as offering advanced functionality, all described below.

Figure 3:
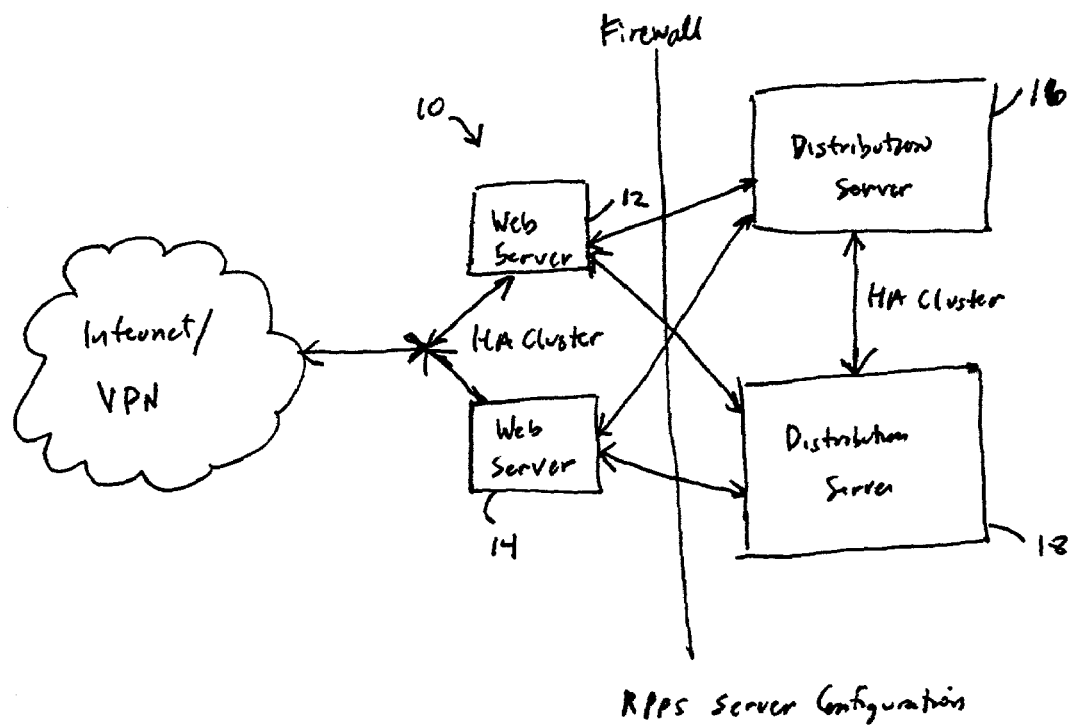
FIG. 3 is a block diagram showing the preferred server configuration of the RPPS in accordance with the present invention.

As shown in FIG. 3, the RPPS will include or be coupled to a RPPS server configuration 10 (also referred to herein as the switching system or switch) which will preferably have both high-availability (HA) failure and contingency capabilities. In other words, a high-availability arrangement is provided wherein the server will move all processing to another server on another site in the event of a site failure ("contingency"), and wherein the server moves all processing to another server in the event of a domain failure ("failure"). Preferably, two web servers 12, 14 will service two distribution servers, 16, 18, one for production, and one for testing. All servers are preferably scalable for high volume situations, and the distribution servers will preferably contain 6 CPUs and 6 GB of RAM. The distribution server(s) will, as described below, determine, based on a capture of routing information and a file look-up table, to which addresses particular messages should be sent or "distributed." A firewall, constructed in accordance with techniques known in the art, will preferably be placed between the web servers and the distribution servers.

Figure 4:
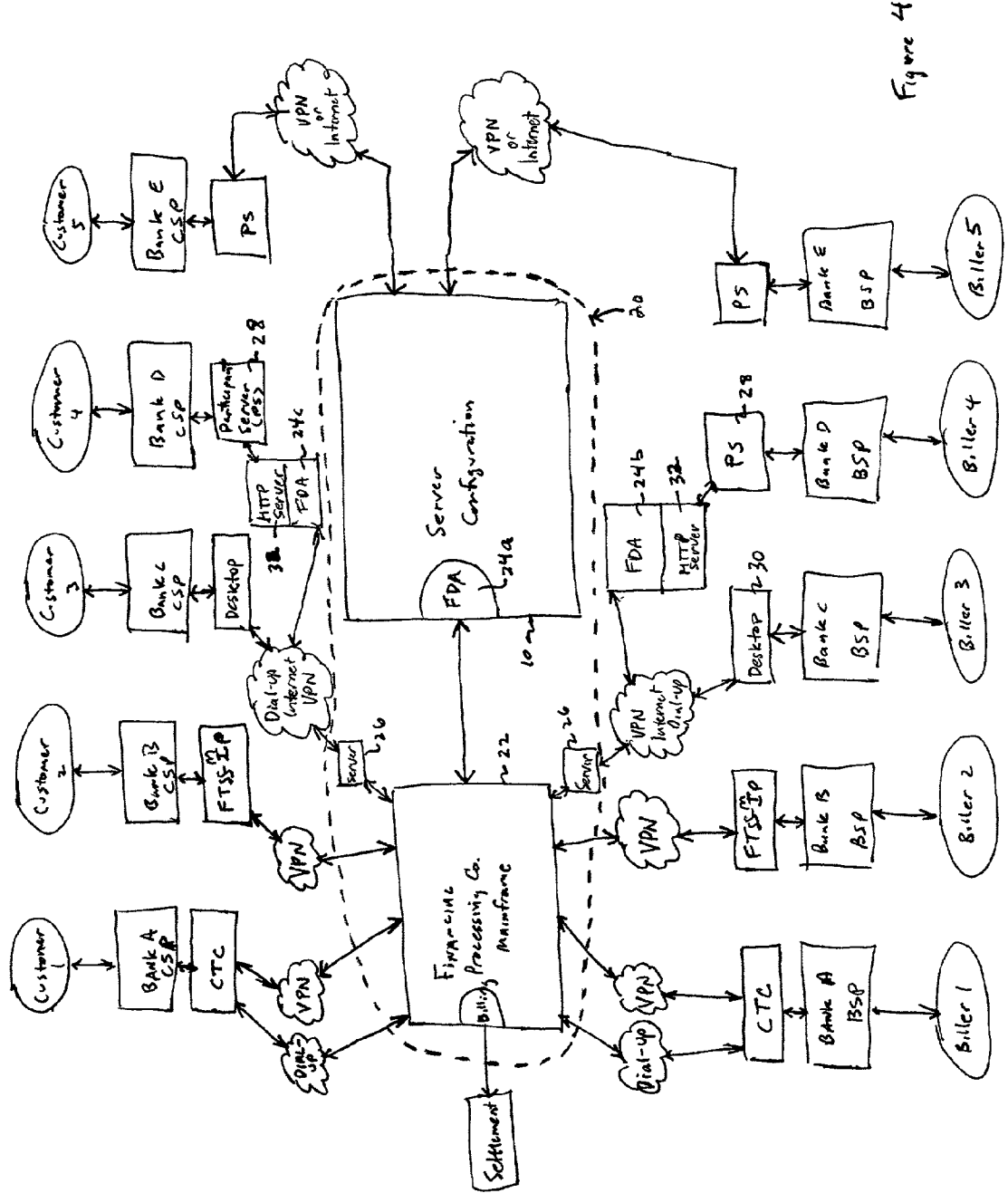
FIG. 4 is a block diagram showing the overall relationship of the various components of the bill payment and presentment system and the various options of connecting thereto in accordance with the present invention.

Further in accordance with the present invention, various connectivity options are provided which allows for enhanced communication with the RPPS, particularly with those participants who choose not to communicate over open public communication lines. As shown in FIG. 4, these options include, as described below, a complex-to-complex connection ("CTC"), file transfer scheduling interface processing ("FTS-IP"), a file express application ("FE"), the Internet, and a virtual private network or VPN, mentioned above.

FIG. 4 is a block diagram showing the overall relationship of the various components and participants of the bill payment and presentment system and the various options of connecting to the RPPS switching system 10 or "switch" in accordance with the preferred embodiment of the present invention. As depicted, one or more customers 1 to n (customers 1 to 5 are shown) participate in a bill payment and presentment system. Each customer has a financial account with one or more banks A to E which also participate in the system. These banks, possibly along with non-financial third party processors, assume the role of CSP. Similarly, there are one or more billers or service providers, such as your local electric, gas or telephone company, depicted as billers 1 to 5 in FIG. 4, also affiliated with their respective bank or even non-financial third party processor. In this case, banks A to E are shown which assume the role of BSP.

As mentioned above, there are various methods of communicating or connecting with the RPPS 20 which is preferably comprised of a financial processing company mainframe computer, such as MasterCard's mainframe computer 22, and server configuration or switching system 10. Unlike prior art switching systems, the present invention allows for server to server, file to server, server to file and file to file connectivity, made possible in part through an interface file distribution agent (FDA) 24a, 24b, 24c, preferably residing at three different locations, one within the RPPS 20 itself (24a), one on a BSP site (24b), and one on a CSP site (24c). In this manner, a mainframe-file based participant (e.g., a CSP) can communicate through the switching system with an Internet-based or other mainframe-file based participant (e.g., a BSP).

All three FDAs have similar functionality, that of starting the conversion process, a flat-file (or a mainframe application file) into an HTTP-based message, and vice-versa. More specifically, the FDA appends an HTTP header to the OFX formatted mainframe application file message, and sends that entire message to the distribution server which, based on a capture of the routing information and the file look up table, determines where to send the message.

With this preferred capability, the FDAs allow the RPPS to handle all file delivery between the file-based CSPs and the file-based BSPs. The CSP only needs one connection (to the RPPS system) to reach all the BSPs. The RPPS will determine the endpoint via the included routing information, whether it is a file-based or an Internet-based participant, and the protocols necessary to communicate with that participant.

The different connectivity options will now be described in connection with FIG. 4. The first few of these options are for those participants without a designated in-house bill payment and presentation server; significantly, these participants can still participate in a bill payment and presentation system and connect to the RPPS (preferably through the GFT) without using the Internet. Rather, other file delivery methods are implemented utilizing OFX messages to allow for the processing of mainframe based application files in batch mode.

The CSP for customer 1 and BSP for biller 1 are both shown as utilizing a complex-to-complex (CTC) communication connection which includes a software communication package which enables the transfer of data or files into the central financial processor mainframe (FPM) by dial-up or by leased line communication, for instance the Virtual Private Network (VPN), which is a secured extranet of leased lines that creates a private and secured transmission method.

Participants (CSPs and BSPs) may also use (as shown by Banks B in FIG. 4) a file transfer scheduling system (FTSs) together with a mainframe interface processor (MIP) which allows a participant to connect to the RPPS to schedule file transfers. The processor is a customized computer that attaches to the participant's host computer and provides direct access over a VPN to the FPM.

Another type of connection to the RPPS can be made by the CSPs and BSPs with use of desktop software 30, shown in use by Bank C in FIG. 4, which allows participants to exchange business application files with the FPM in a secure manner. Certain functions preferably can be accomplished with use of such software, such as:

exchange (download and upload) production and business partner testing application files between the FPM and the participant;

retrieve archived files; and generate file transmission reports.

Access to the FPM is obtained through server 26 which is accessed itself preferably through one of several options: analog dial-up; Internet access; VPN access; or digital dial-up, now briefly described.

Internet access is typical—using a modem or corporate local area network (LAN) to an Internet Service Provider (ISP), the connection can be made to the server 26. The speed may vary depending on Internet routing. Each client/bank workstation maintains a unique Internet Protocol (IP) address. The virtual private network (VPN) enables participants to use a telecommunications carrier's network as if it were their own private line connections. As explained above, VPN is an extranet of leased lines, but can simulate an Internet-based URL or uniform resource locator, the address for a particular home page, web site or server. Lastly, digital dial-up through AT&T Global Network Services-AGNS, provides faster communications than analog connections and Integrated Services Digital Network (ISDN) phone lines with an ISDN modem, which will dial into the server 26.

Connection to server 26 can be made with use at the participant's site of a bill payment and presentment server 28 (PS) or without use of such a designated server. To accomplish connection without use of server 28 (as shown in connection with Bank C in FIG. 4) there is no web server and no FDA at the participant site. The desktop application 30, which preferably includes Internet access software, such as MasterCard's On-Line, and file management software, such as MasterCard's File Express, preferably interacts directly with downloaded and uploaded folders to communicate with the RPPS system 20, which it still may do via dial-up (for instance, AT&T Global Network Services—AGNS), Internet access or the VPN.

The connection to server 26 with use at the participant's site of PS server 28 requires the use of an FDA. As shown in FIG. 4, FDA 24b or 24c is installed at the participant's site and enables the participant to communicate with a local, internal, HTTP server 32, which will then communicate through FDA 24b or 24c to the RPPS system 20. Here, the local FDAs 24b or 24c convert the mainframe files to stream-based messages and vice-versa.

There are several advantages to this connectivity method, such as an internal server (thereby dispensing with the need for digital certificates as known by those skilled in the trade), and a reliable, secure connectivity with the RPPS system. The FDA will establish an "In" and "Out" folder, and the FDA will use these folders to process files into HTTP posts or streams (and vice-versa).

Preferably, all files from the IN folder that the FDA streams to a web server will then be archived and moved to a "Processed" folder. This folder will serve as an archive of files that have been posted to their web server. The corresponding HTTP stream from the web server will then be converted to a flat file in the appropriate upload directory. Once the file has been uploaded successfully the file will preferably be moved to a "Sent" folder. Preferably, all RPPS files received or sent using server 26 will be archived.

As discussed above, the interface FDA plays a key role in the RPPS process since its function allows the RPPS switch to process both mainframe files and Internet-based HTTP files by converting flat-files (or those sent via private or dedicated lines) into HTTP Posts (those capable of transmission over the Internet) and vice-versa. For instance, a CSP participant in accordance with the preferred embodiment of the invention, is capable of sending mainframe files in batch to the RPPS which in turn converts these files to HTTP format for Internet transmission.

More particularly, mainframe application files in OFX format are sent to the FPM in batch form. The RPPS FDA 24a receives the files through an "In" folder and appends an HTTP header or, in other words, processes a file to an HTTP post so as to make the mainframe file Internet accessible. The aggregate message (with HTTP header) is forwarded to the server configuration which determines, based on a capture of the routing information and on a file look-up table (not shown), the address of the intended recipient(s)—where the message should be sent. After processing the file, it is preferably moved to a "Sent" folder and archived.

If the look-up table does not have an Internet address for the "end-point" (i.e., the BSP or CSP) then an "error" message is available. If the end point is not otherwise Internet accessible, then the message is placed in an "Out" folder and routed back to the mainframe for mainframe processing and delivered via the GFT to the appropriate end point.

The FDA 24b for the BSP and the FDA 24c for the CSP either create an HTTP post from a flat file or process it back to a flat file. Normally, the FDA 24b for the BSP preferably creates and sends an HTTP post to the BSP, waits for a response and processes it to a flat file for the RPPS. Similarly, the FDA 24c for the CSP normally accepts an HTTP post from the CSP and processes it to a flat file for the RPPS.

Alternatively, for a bill push response, described below, the FDA 24b accepts an HTTP post and converts that to a flat file for the RPPS. The FDA 24c, for bill push, creates an HTTP post to the CSP's web server 30.

There are additional preferred optional functionalities of the invention, which will now be described.

The first is called latency handling. It is possible in an electronic communication system such as described here that a situation arises where a response to a request (for example a CSP request) is taking an inordinate amount of time (due to, for instance, the voluminous amount of requests being made or because certain lines are down), and the CSP would rather come back at another time for the response. In this case, it is preferable that the RPPS not keep an open connection between the CSP and RPPS over an extended period of time. RPPS will then preferably send an HTTP status code to the CSP, informing the CSP that they need to re-request the message at a later time.

Alternatively, if the CSP is message "push" enabled, the CSP need not re-request a transmission through this method. They can send a request, and then wait for the RPPS system to push the response back to them. In the meantime, the RPPS system can deliver an immediate message to the CSP that it will respond when it can.

More particularly, the message bill "push" is a transmission where a BSP wishes to send a transmission to a CSP (namely bill presentment) without the CSP requesting this information. This not only reduces the system load for both the CSP and BSP, but also gives the information when it is available (CSP does not have to ask multiple times when the information is not there yet).

Another enhanced functionality employs a message "burst" or a means by which a CSP can communicate with multiple BSPs in one transmission. (This can be employed by Internet-based participants who can send burst messages directly to the switching system without communicating with the FPM or FDA.) For instance, one CSP can communicate with the RPPS and collect billing information from several billers or BSPs. This enables the CSP to combine multiple transmissions inside one transmission container, which allows them to send these transmissions with one connection. RPPS will sever the connection with the CSP upon receipt, and the CSP has two options available to it for retrieving the responses. The CSP can either be latency enabled, or message push enabled.

Figure 5:
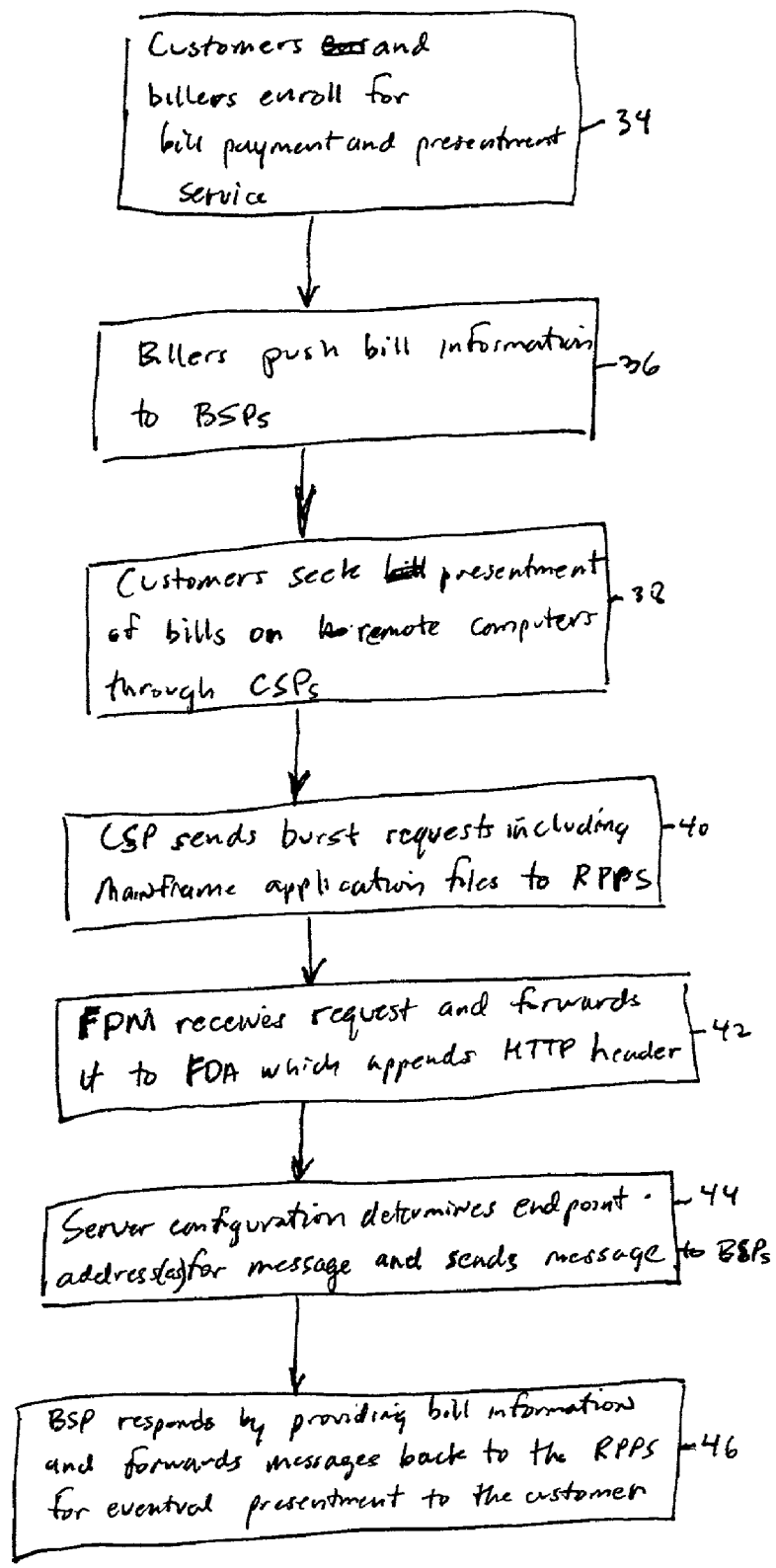
FIG. 5 is a flow chart summarizing a preferred process of bill payment and presentment in accordance with the present invention where mainframe application files are utilized.

FIG. 5 illustrates a flow chart summarizing a preferred process of bill payment and presentment in accordance with the present invention where mainframe application files are utilized. Initially, the customers and billers need to enroll for the bill payment and presentment service at step 34. Billers preferably push bill information to BSPs at 36 and customers seek presentment of bills on remote computers through CSPs at 38. The CSPs preferably send burst message requests which include mainframe application files to the RPPS at 40. At step 42, the FPM receives the mainframe application files and forwards them to the FDA 24a which appends an HTTP header, and at step 44 the server configuration splits the message into streams based on intended recipient or endpoint (for bursts) and determines the web endpoint or intended recipient address(es) for the message(s) and sends the message(s). As part of the process, the local FDAs 24b, 24c convert the mainframe files to stream-based messages and vice-versa. The system of the invention thus enables mainframe systems to feed messages in batch mode and web-enables the mainframe applications through the FDA 24a and server configuration 10.

At step 46, the BSP responds by providing bill information and returns the message with such information back to RPPS for eventual presentment to the customer. The customer then has the option to pay the presented bills through the FPM which triggers the typical settlement process (see FIG. 4).

The foregoing merely illustrates the principles of the invention. It will thus be appreciated that those skilled in the art will be able to devise numerous systems and methods which, although not explicitly shown or described herein, embody the principles of the invention and thus within the spirit and scope of the invention.

We claim:

1. A method for electronically routing billing information over a communications network using an open financial exchange communication protocol, comprising;
    providing billers and customers to participate in an electronic bill payment and presentment system having a centrally located mainframe system;
    providing a plurality of customer service providers to interface with one or more of said customers;
    providing a plurality of biller service providers to interface with one or more of said billers and to collect said billing information from said billers with respect to one or more of said customers;
    providing a centrally located switching system which allows for server to server, file to server, server to file and file to file connectivity, in part through the use of a file distribution agent, coupled to said bill payment and presentment system for coordinating the routing of messages between said customer service providers and biller service providers;

generating at said customer service provider or at said biller service provider mainframe application files comprising said messages;

forwarding said mainframe application files in batch mode to said centrally located mainframe system;

and converting at said switching system said mainframe application files into Internet accessible addresses for delivery of said messages over the Internet to one or more intended recipients comprising at least one of said customer service providers or said biller service providers.

2. The method of claim 1 wherein said converting step comprises: using a file distribution agent for appending to said mainframe application files a HTTP header; and using a look-up table to determine the Internet accessible addresses.

3. The method of claim 2 further comprising: pushing said messages to one or more of said customer service providers; and bursting said messages to two or more of said plurality of biller service providers.

4. In a bill payment and presentation system, a method for electronically routing billing information over a communications network using an open financial exchange communication protocol, comprising:

providing a switching system for routing messages including said billing information between one or more customer service providers and one or more biller service providers;

providing multiple connectivity options into said switching system, said options including an open connection over public lines and a closed-line connection;

forwarding by one of said customer service providers or one of said biller service providers mainframe application files including said messages with one or more intended recipients over said closed-line connection to said switching system;

converting at said switching system said mainframe application files into Internet accessible addresses for delivery of said messages to said intended recipients over said public lines.

\* \* \* \* \*